United States Patent [19]

Kuhn et al.

[11] 4,298,579

[45] Nov. 3, 1981

[54] METHOD OF PRODUCING PUO₂ BY CALCINATION OF PU OXALATE PRODUCED BY DISCONTINUOUS PRECIPITATION FROM SOLUTIONS CONTAMINATED WITH AMERICIUM

[75] Inventors: Karl-Dieter Kuhn, Liedolsheim; Karl-Heinz Koch, Alzenau-Albstadt, both of Fed. Rep. of Germany

[73] Assignee: Alkem GmbH, Hanau, Fed. Rep. of Germany

[21] Appl. No.: 802,553

[22] Filed: Jun. 1, 1977

[30] Foreign Application Priority Data

Jun. 3, 1976 [DE] Fed. Rep. of Germany ....... 2624990

[51] Int. Cl.² ............................................ C01G 56/00
[52] U.S. Cl. ....................................... 423/11; 423/251
[58] Field of Search ................................ 423/251, 11

[56] References Cited

U.S. PATENT DOCUMENTS

| | | | |
|---|---|---|---|
| 2,833,800 | 5/1958 | Mastick et al. | 423/11 X |
| 2,867,640 | 1/1959 | Gofman | 423/251 X |
| 2,868,620 | 1/1959 | Garner | 423/251 |
| 2,906,597 | 9/1959 | Ritter et al. | 423/251 X |
| 4,025,602 | 5/1977 | Campbell et al. | 423/11 X |

FOREIGN PATENT DOCUMENTS

| | | | |
|---|---|---|---|
| 8410403 | 9/1964 | Netherlands | 423/251 |
| 1224248 | 3/1971 | United Kingdom | 423/251 |

OTHER PUBLICATIONS

Doty, J. W. et al., "Preparation of Micron-Sized 238 PuO₂" In J. of Nuc. Matr. 35(2): 247–249, 1970.

Primary Examiner—Richard E. Schafer
Attorney, Agent, or Firm—Herbert L. Lerner

[57] ABSTRACT

Conversion of plutonium nitrate containing americium as a contaminant into plutonium dioxide while concurrently preventing americium contaminant from passing into the plutonium dioxide product. Discontinuous precipitation of plutonium oxalate is effected by maintaining the Pu nitrate-nitric acid solution containing americium in a reaction vessel at 60°–95° C., adding granular solid oxalic acid or solid ammonium oxalate in freeflowing form substantially free of clusters and lumps in stoichiometric deficiency of up to 7% of oxalic acid for reaction with the Pu in the solution; separating resultant Pu oxalate precipitate into which at least a portion of the americium contaminant has been prevented from entering, and calcining the purified Pu oxalate precipitate to PuO₂.

10 Claims, 2 Drawing Figures

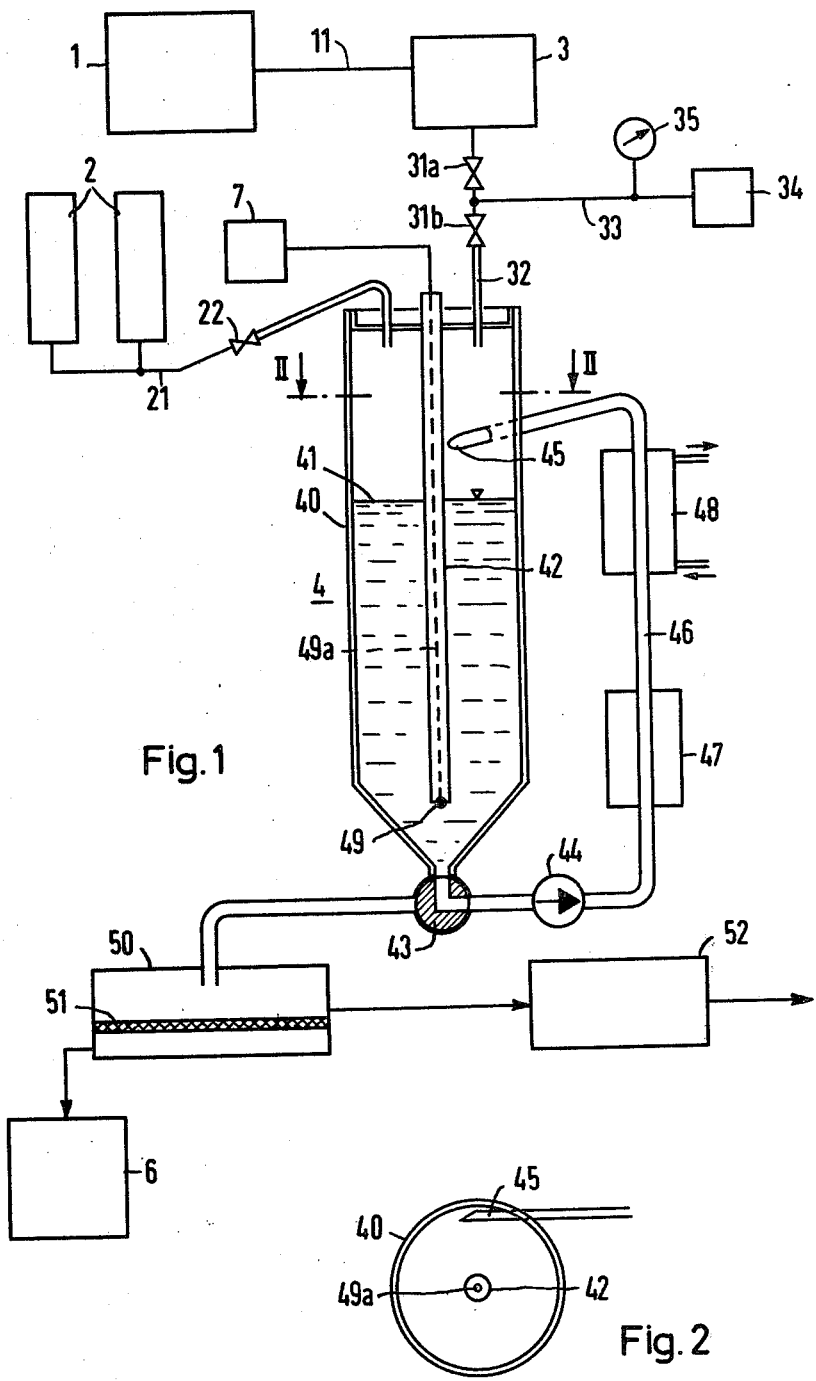

4,298,579

METHOD OF PRODUCING PUO₂ BY CALCINATION OF PU OXALATE PRODUCED BY DISCONTINUOUS PRECIPITATION FROM SOLUTIONS CONTAMINATED WITH AMERICIUM

BACKGROUND OF THE INVENTION

1. Field of the Invention

This invention relates to conversion of plutonium nitrate into plutonium dioxide and more particularly refers to a new and improved method and apparatus for producing a purer plutonium dioxide by discontinuous precipitation of plutonium oxalate from plutonium nitrate containing americium as an impurity.

2. Background of the Invention

Discontinuous precipitation of plutonium oxalate from plutonium nitrate-nitric acid solution within a reaction vessel, by means of solid oxalic acid or solid ammonium oxalate, with subsequent separation of the plutonium oxalate from the residual liquid and calcination of the precipitate is known. The end product is $PuO_2$. Such a process is also called conversion of plutonium nitrate into plutonium dioxide. The plutonium nitrate is produced in the processing of burned-up fuel assemblies and is the starting product for the fabrication of plutonium-containing nuclear reactor fuel rods. Such a conversion plant is described in the journal "Kerntechnik". vol. 15, 1973, pages 257 to 263.

The method in the literature reference, however, was not found entirely satisfactory. In addition to desired improvements in the process cycle it was found that the plutonium nitrate feed contained americium as a contaminant which passed into the precipitate of plutonium oxalate resulting in an impure plutonium product. The decontaminant is the decay product of plutonium-241, namely, americium-241, which is a gamma radiator, which generally varies in amount from a fraction of a percent to several percent.

SUMMARY OF THE INVENTION

An object of the present invention is to provide a method and apparatus for producing plutonium dioxide and effect removal of the contaminant americium-241. Another object of the invention is to provide a method and apparatus for concurrently processing plutonium nitrate and decontaminating the plutonium by separating it from the americium. A still further object of the invention is to provide an efficient method and apparatus for converting plutonium nitrate to plutonium dioxide. With the foregoing and other objects in view, there is provided in accordance with the invention a method for the production of $PuO_2$ by discontinuous precipitation of Pu oxalate from a Pu nitrate-nitric acid solution in a reaction vessel with solid oxalic acid or solid ammonium oxalate, subsequent separation of the Pu oxalate precipitate from the residual liquid and calcination of the Pu oxalate precipitate to $PuO_2$, the improvement including concurrently preventing americium contained in the Pu nitrate-nitric acid solution as a contaminant from passing into the Pu oxalate precipitate by maintaining the Pu nitrate-nitric acid solution containing americium as a contaminant at a temperature of 60°–95° C., adding to the 60°–95° C. solution an amount of the solid oxalic acid or solid ammonium oxalate in free-flowing granular form substantially free of clusters and lumps, in stoichiometric deficiency of up to 7% of oxalic acid for reaction with the Pu in the 60°–95° C. solution, separating the resultant Pu oxalate precipitate into which at least a portion of the americium contaminant has been prevented from entering from the residual liquid in which the americium contaminant is retained and calcining the thus purified Pu oxalate precipitate to $PuO_2$.

In accordance with the invention there is provided an apparatus for the production of $PuO_2$ by discontinuous precipitation of Pu oxalate from a Pu nitrate-nitric acid solution containing americium as a contaminant with solid oxalic acid or solid ammonium oxalate to precipitate Pu oxalate while retaining americium in the solution, a reaction vessel for maintaining a body of the Pu nitrate-nitric acid solution, a solution inlet in the reaction vessel for the introduction of Pu nitrate-nitric acid solution containing americium, a metering device for feeding metered granular solid oxalic acid or solid ammonium oxlate, circulating means for circulating the solution in reaction vessel, heating means for heating the reaction vessel content, cooling means for cooling the reaction vessel content, a discharge outlet in the reaction vessel for the discharge of reaction products containing Pu oxalate precipitate suspended in residual liquid, a filter vessel containing a sintered metal filter for separating the Pu oxalate precipitate from the residual liquid connected to said discharge outlet, and a calcining furnace for converting said Pu oxalate precipitate to $PuO_2$.

In a preferred embodiment of the invention there is provided an apparatus for the production of $PuO_2$ by discontinuous precipitation of Pu oxalate from a Pu nitrate-nitric acid solution containing americium as a contaminant with solid oxalic acid or solid ammonium oxalate to precipitate Pu oxalate while retaining americium in the solution, including a reaction vessel for maintaining a body of the Pu nitrate-nitric acid solution, a solution inlet in the reaction vessel for the introduction of Pu nitrate-nitric acid solution containing americium, an outlet at the bottom of the reaction vessel, a conduit connecting the outlet to an upper part of the reaction vessel with the conduit opening tangentially in the reaction vessel above the solution therein, a pump interposed in the outlet to recirculate the Pu nitrate-nitric acid solution, a heater disposed adjacent the conduit to indirectly heat the recirculating solution in the conduit, a cooler disposed adjacent the conduit to indirectly cool the recirculating solution in the conduit, a supply tank for solid oxalic acid or solid ammonium oxalate, a metering device metering the amount of the solid to the reaction vessel connected to the supply tank, a pipe from the metering device to the reaction vessel for the flow of metered solid, a discharge outlet at the bottom of the reaction vessel for the discharge of reaction products containing Pu oxalate precipitate suspended in residual liquid, a filter vessel containing a sintered metal filter for separating the Pu oxalate precipitate from the residual liquid connected to the discharge outlet, and a calcining furnace for converting the Pu oxalate precipitate to $PuO_2$.

Other features which are considered as characteristic for the invention are set forth in the appended claims.

Although the invention is illustrated and described herein as embodied in a method of producing $PuO_2$, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 diagrammatically illustrates apparatus for carrying out the present invention, and FIG. 2 is a top view of the reaction vessel cut-away to show the tangential inlet of the recirculating reaction products.

DETAILED DESCRIPTION OF THE INVENTION

In accordance with the invention, there is a stoichiometric deficiency of oxalic acid with the mass ratio of the solid oxalic acid to the amount of plutonium in the plutonium nitrate-nitric acid solution. The stoichiometric deficiency for good results is adjusted up to 7% with increasing americium. *The americium content depends on the age of the plutonium, it may be for example 2,5% in relation to the Pu-content. Solid oxalic acid usually in the form of $H_2C_2O_4.2H_2O$ or ammonium oxalate which reacts with the nitric acid in the solution to form oxalic acid may be used as the source of oxalic acid. The mass ratio is based on the oxalic acid content in these sources. It was found that clusters or lumps of solid oxalic acid interfered with the feeding of measured amounts of oxalic acid and of particular importance such lumps or clusters often resulted in uneven distribution of the solid with local points of overreaction and underreaction. To overcome this difficulty the solid oxalic acid or solid ammonium oxalate should desirably be free of clusters and lumps and be a free-flowing granular solid which will be readily distributed and suspended in the solution thus providing uniform reaction. It is helpful for the solid to have a grain size as uniform as possible. For better distribution the solid is gradually added within the precipitation period which is usually about 30 to 90 minutes, preferably about 1 hour. The oxalic acid is added after the plutonium nitrate solution is heated to 60° to 95° C. It has been found to be particularly advantageous to hold the temperature of the plutonium nitrate constant at 80° C.±5°.

Referring to the drawings, supply tank 1 contains solid oxalic acid, which has a crystalline character. The oxalic acid is fed via line 11 to a metering device 3. The metering device contains, for example, a simple crushing mechanism for eliminating clumps and clusters and obtaining a more uniform grain size of the solid oxalic acid which is free-flowing, as well as a conveyer screw which transports the solid oxalic acid to the reaction vessel 4 via the line 32 and shut-off valves. For safety reasons, this shut-off valve is provided in duplicate, 31a and 31b. The operating state of the valves can be monitored by applying a constant overpressure from a pressure source 34, e.g., a cylinder with movable piston, and the connecting line 33 to the space between the valves, and by means of a pressure gauge 35.

Before the oxalic acid is fed in, the reaction tank 4 is filled from the supply tanks 2 via the line 21 and the valve 22 with plutonium nitrate-nitric acid solution. The plutonium content of this nitric acid solution is normally below 200 g per liter but the plutonium content may be higher on occasions.

The charge 41 of plutonium nitrate-nitric acid solution in the reaction tank 4 is continuously circulated via the valve 43, the pump 44 and the bypass line 46, which opens into the tank 4 tangentially as shown by numeral 45 in FIG. 2. A heater 47 surrounding conduit 46 indirectly heats the solution 41 to a temperature preferably of 80° C. and the solution 41 is held constant three within ±5°. Although an electric heater is convenient, the heater may take the form of a jacket through which a hot fluid flows. The tangential inlet 45 serves to provide a helical flow of liquid within the reaction tank and thereby, thorough mixing and homogenization of the liquid is brought about. Also, due to the fact that the inflowing liquid runs down along the wall of the tank, splashing is avoided, which could lead to undesirable crust formation on the portion of the reaction tank 4 which is not wetted by the plutonium solution.

Only after the mentioned temperature mark is reached is solid oxalic acid fed to the circulating plutonium solution via the metering device 3. Control of the start of solid oxalic acid feed is governed by the temperature device 7 connected via connecting line 49a to a temperature sensor 49. The temperature sensor as shown in the drawing is arranged at the lower end of a centrally arranged absorber rod 42 which has the purpose of positively preventing a nuclear excursion of the contained plutonium solution. Its effect is aided by providing the tank wall 40 with neutron-absorbing materials such as boron, cadmium, hafnium, gadolinium, etc. The wall may consist, for instance, of a glass which contains one or several of these elements; however, the absorbers can also be applied in a separate layer outside the wall proper of the reaction tank. If the tank 4 consists of a corrosion-resistant metallic material, this layer could consist of a suitable enamel, but it could also be filled, for instance, in powder form, into the interspace of a double-walled tank 4. Other possibilities of arranging neutron-absorbing materials for this purpose of course also exist.

Due to the uniform inflow of the solid oxalic acid, uniform precipitation of plutonium oxalate according to the following equation is obtained:

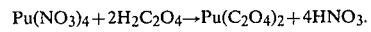

$$Pu(NO_3)_4 + 2H_2C_2O_4 \rightarrow Pu(C_2O_4)_2 + 4HNO_3.$$

The plutonium oxalate is a crystalline solid which, together with the liquid in the tank 4, which consists substantially of nitric acid at the end of the reaction, forms a suspension. The end concentration of the nitric acid is normally less than 5.2 mol/liter. After the end of the precipitation period which may be of different length depending on the volume of the tank, e.g., about 1 hour for a tank volume of 50 l, this suspension is circulated by the pump 44 for about the same period of time. The supply of solid oxalic acid is shut off during this period by the valve 31a. This additional circulation after the end of the precipitation period has the benefit of equalizing the plutonium oxalate crystals as to grain size, which can be ascribed particularly to the effect of the pump impeller of the centrifugal pump which reduces clump and cluster formation.

With stoichiometric deficiency mass ratio between the plutonium nitrate solution and the oxalic acid, the americium contained in the plutonium isotope mixture of the plutonium nitrate-nitric acid solution remains for the most part in solution and thereby, contrary to the plutonium oxalate, does not crystallize out. As a consequence, the americium content of the plutonium oxalate crystals, after filtering, is substantially lower than the americium content with respect to the plutonium in the original solution. In this manner, decontamination factors of 15 may be obtained. However, for best results the stoichiometric deficiency setting should be raised up to 7% with increasing americium content. Thus, with the aid of this stoichiometric deficiency setting, decontamination factors of this magnitude are made possible.

After the end of the circulation period following the precipitation period, the electric heater 47 is switched off and the cooling device 48 is switched on. After a short time, the suspension in the tank 4 has cooled down to about 40° C.; and among other things, a growth of the precipitated plutonium oxalate particles then occurs. The valve 43 provided at the bottom of the reaction tank 4 is then switched over, so that the cooled-down suspension is transported into the filter tank 50. There, the plutonium oxalate settles on a sintered-metal bottom 51, with the liquid running through bottom 51, and out filter tank 50, then into and collecting in the tank 6. The separated liquid in tank 6 consists substantially of nitric acid together with the contaminant americium nitrate retained in the liquid. Of course, other filter and separator devices of known design can also be used; it is necessary here, however, that they consist of materials that are not attacked by the nitric acid. As a spatial concentration of the plutonium takes place in filter device 50, care must be taken that here too, the critical mass is not exceeded. This is achieved by feeding only part of the content of the reaction tank 4 to the filter 50. It is furthermore possible, of course, to also equip the filter tank 50 with neutron-absorbing materials and to incorporate, in particular, such substances also into the sintered metal 51.

After the end of the filtering period, the filtered material is fed to a calcining furnace 52 and plutonium oxalate precipitate is heated during its passage in the furnace in a selected gas atmosphere, such as, for instance, nitrogen, to 550° C. The furnace has a cooling zone in known manner and therefore, not specifically shown, from which the plutonium dioxide produced by the calcining can be removed in powder form. Discontinuous operation of the furnace can of course also be employed. The chemical process occurring here may be described by the following equation:

$$Pu(C_2O_4)_2, 6H_2O \rightarrow PuO_2 + 2CO + 2CO_2 + 6H_2O.$$

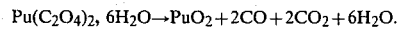

In addition, it should be mentioned that all apparatus and piping as well as pumps consist of materials as acid-resistant as possible and the nature of their surface is made to minimize deposition of plutonium-containing residues. This also facilitates the cleaning of the equipment, for instance, with nitric acid and hydrofluoric acid.

To illustrate the method further, it should also be mentioned that the reaction tank 4 may have, say, a diameter of 250 mm with a height of 2.5 m and is therefore suitable for treating a quantity of 50 l of plutonium nitrate-nitric acid solution. There are about 5 to 10 kg plutonium in the solution. The amount of solid oxalic acid ($H_2C_2O_4.2H_2O$) required for carrying out the reaction is then about 5 to 10 kg. These data are to be considered merely as an example; several such devices can be operated in parallel as required, or their dimensions can be adapted accordingly. The liquid in the collecting tank 6 is radioactive in view of Pu traces and the americium content may, for instance, be concentrated by the method described in the literature reference described at the outset and be further processed in a suitable manner.

It should be mentioned that all parts which might require direct operation, are accommodated in so-called glove boxes, as is usually done in plutonium-processing technology. It is ensured thereby that the operating personnel of such a conversion plant cannot, for all practical purposes, come into contact with the plutonium-containing materials involved in this process.

There are claimed:

1. In a method for the production of $PuO_2$ by discontinuous precipitation of Pu oxalate from a Pu nitrate-nitric acid solution in a reaction vessel with solid oxalic acid or solid ammonium oxalate, subsequent separation of the Pu oxalate precipitate from the residual liquid and calcination of the Pu oxalate precipitate to $PuO_2$, the improvement comprising concurrently preventing americium contained in said Pu nitrate-nitric acid solution as a contaminant from passing into said Pu oxalate precipitate by maintaining the Pu nitrate-nitric acid solution containing americium as a contaminant at a temperature of 60°–95° C., adding to said 60°–95° C. solution an amount of said solid oxalic acid or solid ammonium oxalate in free-flowing granular form substantially free of clusters and lumps, in stoichiometric deficiency of up to 7% of oxalic acid for reaction with the Pu in said 60°–95° C. solution, separating the resultant Pu oxalate precipitate into which at least a portion of the americium contaminant has been prevented from entering from the residual liquid in which the americium contaminant is retained and calcining the thus purified Pu oxalate precipitate to $PuO_2$.

2. Method according to claim 1, wherein the stoichiometric deficiency increases up to 7% with increasing americium content.

3. Method according to claim 1, wherein the temperature of the plutonium nitrate-nitric acid solution is maintained at 80°±5° C.

4. Method according to claim 1, wherein precipitation of said Pu oxalate is effected in a period of 30 to 90 minutes.

5. Method according to claim 4, wherein the nitric acid concentration present at the end of the precipitation period in less than 5.2 mol/liter.

6. Method according to claim 1, wherein the Pu content of the nitric acid solution is less than 200 grams.

7. Method according to claim 1, wherein said solution in the reaction vessel is circulated continuously while maintaining said temperature.

8. Method according to claim 7, wherein circulation of the content of the reaction vessel is continued to maintain said precipitate as a suspension after the end of the precipitation period for maximally the same time.

9. Method according to claim 8, wherein the circulation is accomplished by means of a centrifugal pump.

10. Method according to claim 8, wherein the reaction mixture present as a suspension is cooled down to about 40° C. prior to said separation of Pu oxalate precipitate.

* * * * *